United States Patent
Drum

(10) Patent No.: US 11,088,566 B2
(45) Date of Patent: Aug. 10, 2021

(54) MOTORIZED PERSONAL TRANSPORT CONTROLLER AND CHARGING PORT

(71) Applicant: James Drum, Sarver, PA (US)

(72) Inventor: James Drum, Sarver, PA (US)

( * ) Notice: Subject to any disclaimer, the term of this patent is extended or adjusted under 35 U.S.C. 154(b) by 209 days.

(21) Appl. No.: 16/191,977

(22) Filed: Nov. 15, 2018

(65) Prior Publication Data

US 2020/0161885 A1  May 21, 2020

(51) Int. Cl.
| | |
|---|---|
| *H02J 7/00* | (2006.01) |
| *A61G 5/04* | (2013.01) |
| *A61G 5/10* | (2006.01) |
| *H02J 7/34* | (2006.01) |

(52) U.S. Cl.
CPC ............. *H02J 7/342* (2020.01); *A61G 5/04* (2013.01); *A61G 5/10* (2013.01); *A61G 2203/14* (2013.01); *A61G 2203/16* (2013.01); *H02J 7/00* (2013.01)

(58) Field of Classification Search
CPC .... H02J 7/0054; H02J 7/00; H02J 2007/0062; A61G 5/04; A61G 5/10; A61G 2203/14; A61G 2203/16
USPC ........................................................ 320/103
See application file for complete search history.

(56) References Cited

U.S. PATENT DOCUMENTS

| | | | |
|---|---|---|---|
| 3,437,164 A | 4/1969 | Rabjohn | |
| 6,154,690 A * | 11/2000 | Coleman | A61G 5/006 180/65.1 |
| 9,136,722 B2 | 9/2015 | Haddad | |
| 2006/0070477 A1 | 4/2006 | Serzen | |
| 2008/0041282 A1* | 2/2008 | Goschy | A61G 5/1094 108/141 |
| 2012/0223555 A1* | 9/2012 | Brown, Jr. | A47C 7/725 297/217.4 |
| 2012/0325575 A1* | 12/2012 | Jurkiewicz | A61G 5/1051 180/333 |
| 2014/0021905 A1* | 1/2014 | Tsai | H01R 27/02 320/107 |
| 2018/0203522 A1* | 7/2018 | Stucki | A61G 5/1091 |

FOREIGN PATENT DOCUMENTS

| | | | |
|---|---|---|---|
| CN | 204484523 U | * | 7/2015 |
| CN | 107510557 A | * | 12/2017 |

* cited by examiner

*Primary Examiner* — Richard Isla
*Assistant Examiner* — Dung V Bui

(57) ABSTRACT

A motorized personal transport controller and charging port for conveniently charging electronic devices includes a control housing having a top side, an outer perimeter, and a bottom side. The top side, the outer perimeter, and the bottom side form an inner cavity. The control housing is configured to be coupled to a motorized personal transport. A plurality of controls is coupled to the control housing and is configured to control the motorized personal transport. A charging means is coupled to the control housing. The charging means is configured to be in operational communication with a battery of the motorized personal and to charge a plurality of personal electronic devices.

6 Claims, 5 Drawing Sheets

MOTORIZED PERSONAL TRANSPORT CONTROLLER AND CHARGING PORT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to motorized personal transport controllers and more particularly pertains to a new motorized personal transport controller for conveniently charging electronic devices.

BRIEF SUMMARY OF THE INVENTION

An embodiment of the disclosure meets the needs presented above by generally comprising a control housing having a top side, an outer perimeter, and a bottom side. The top side, the outer perimeter, and the bottom side form an inner cavity. The control housing is configured to be coupled to a motorized personal transport. A plurality of controls is coupled to the control housing and is configured to control the motorized personal transport. A charging means is coupled to the control housing. The charging means is configured to be in operational communication with an electrical system comprising a battery and to charge a plurality of personal electronic devices.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
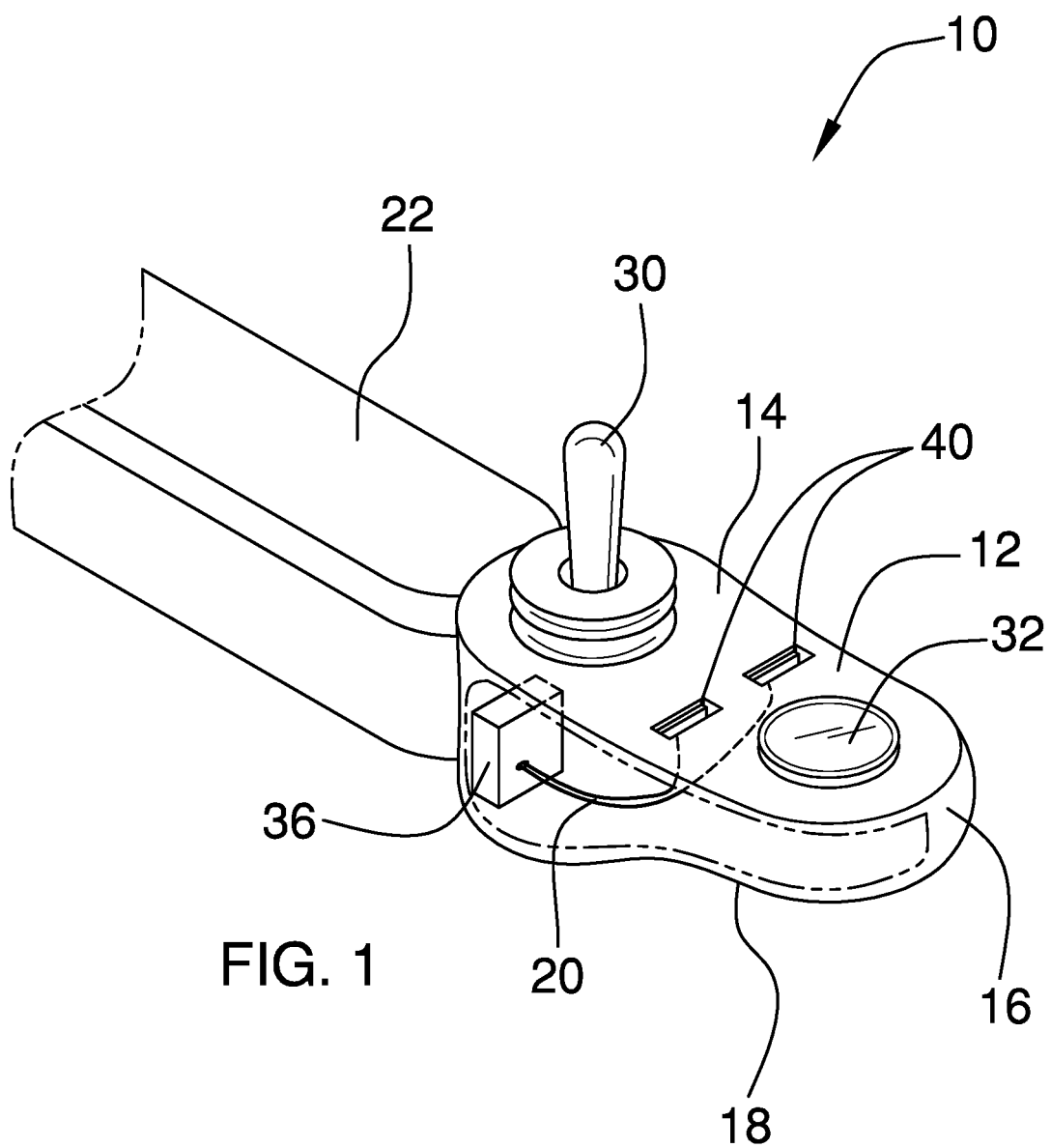
FIG. 1 is an isometric view of a motorized personal transport controller and charging port according to an embodiment of the disclosure.
Figure 2:
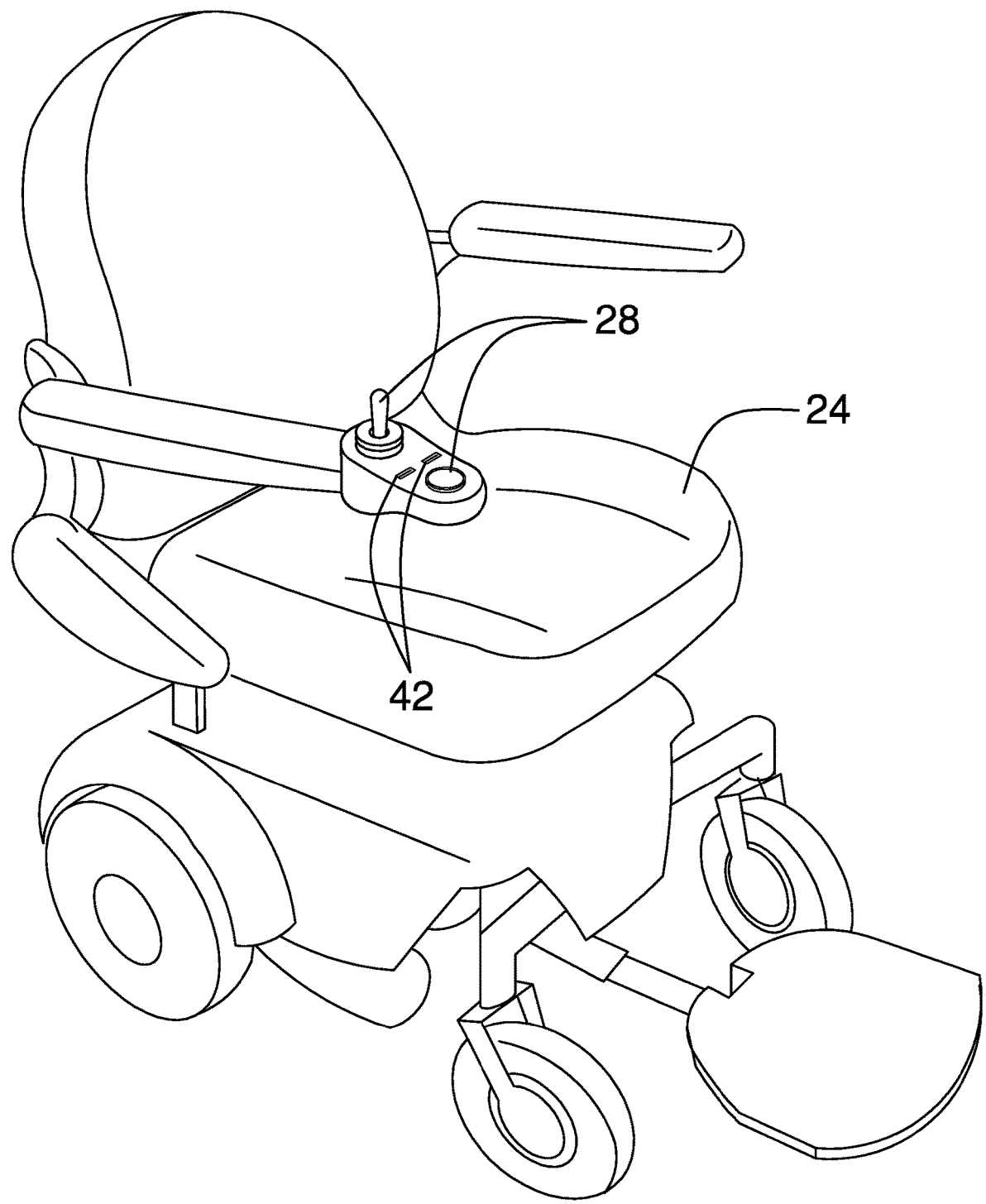
FIG. 2 is an isometric view of an embodiment of the disclosure.
Figure 3:
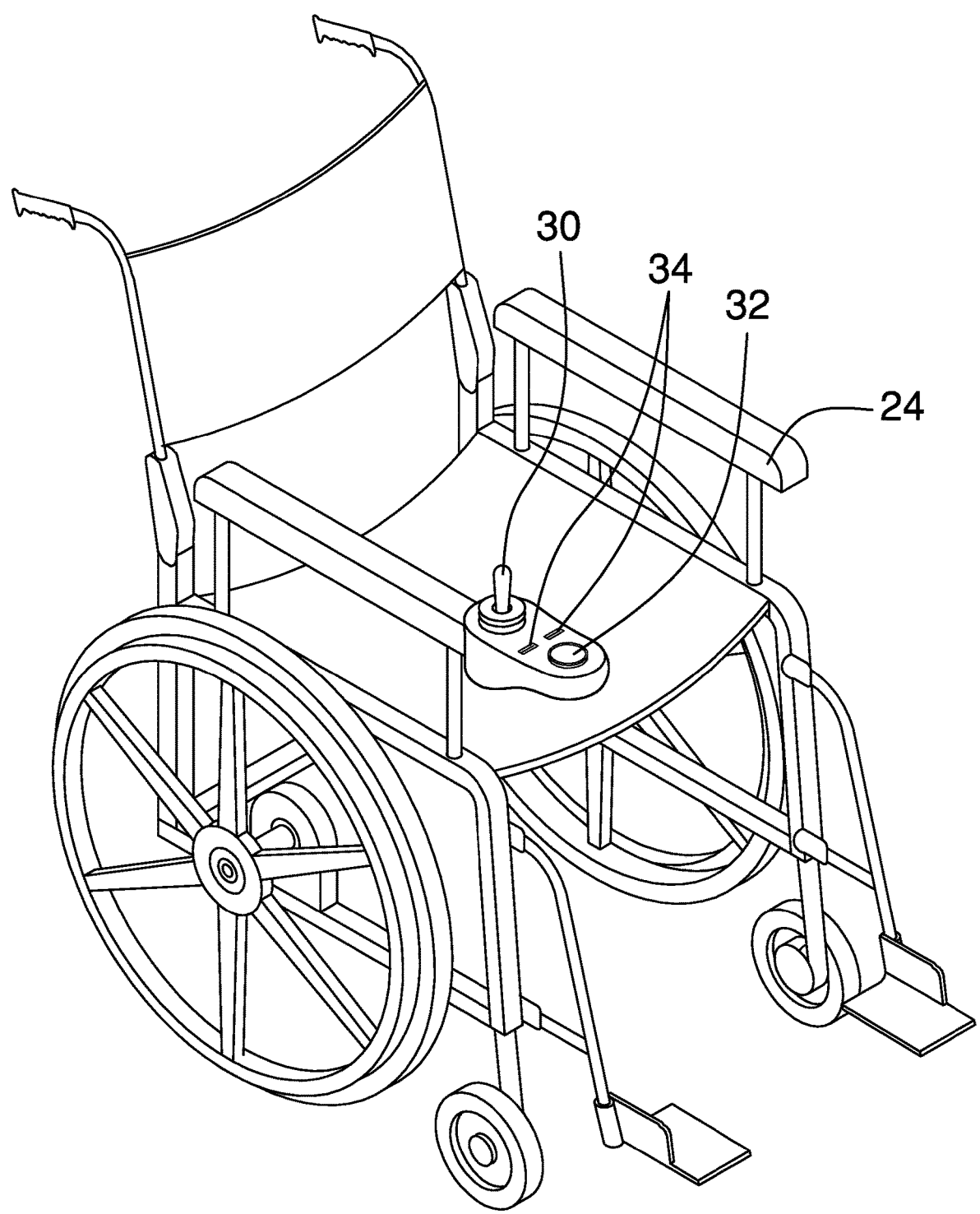
FIG. 3 is an isometric view of an embodiment of the disclosure.
Figure 4:
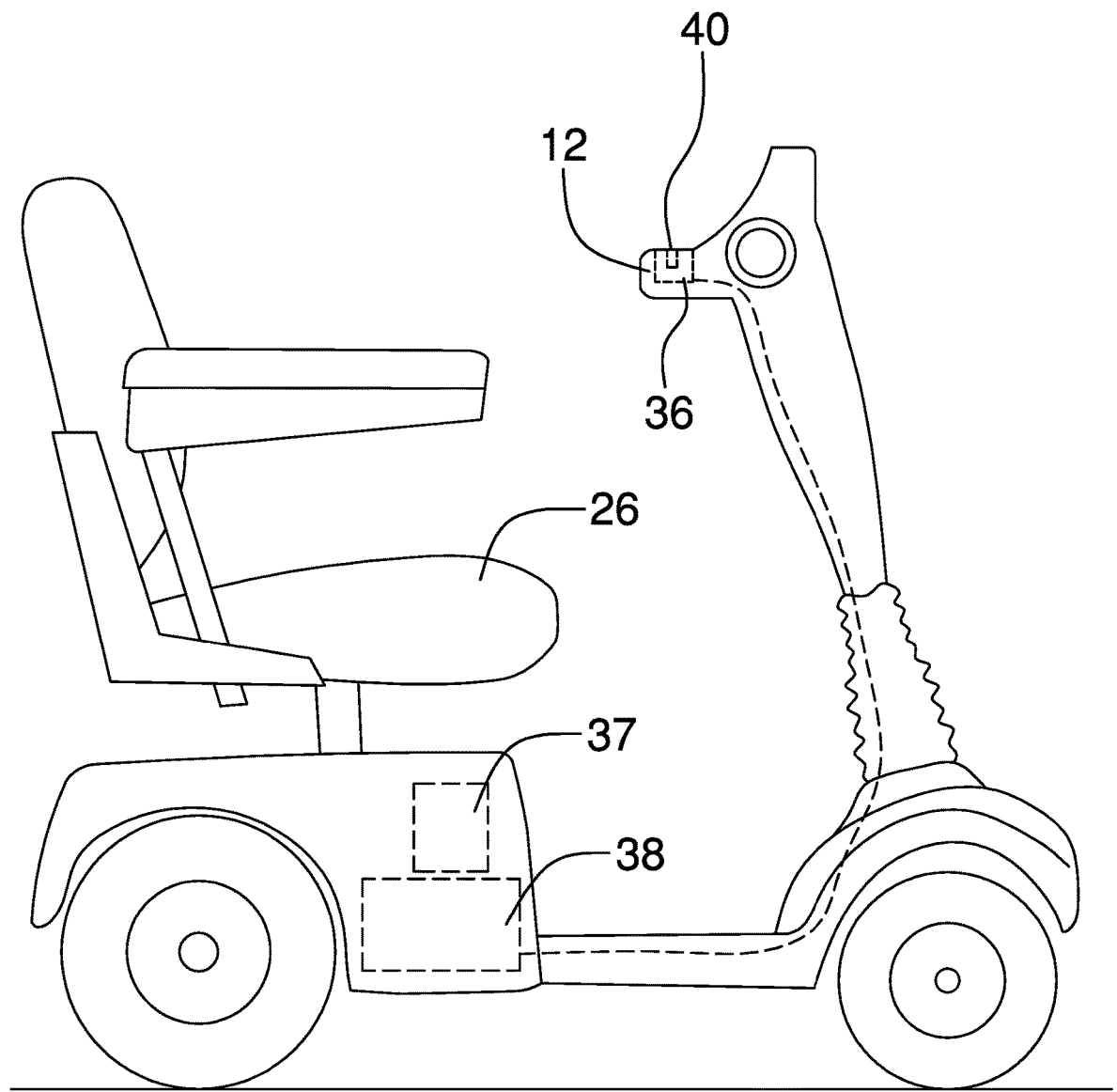
FIG. 4 is a side elevation view of an embodiment of the disclosure.
Figure 5:
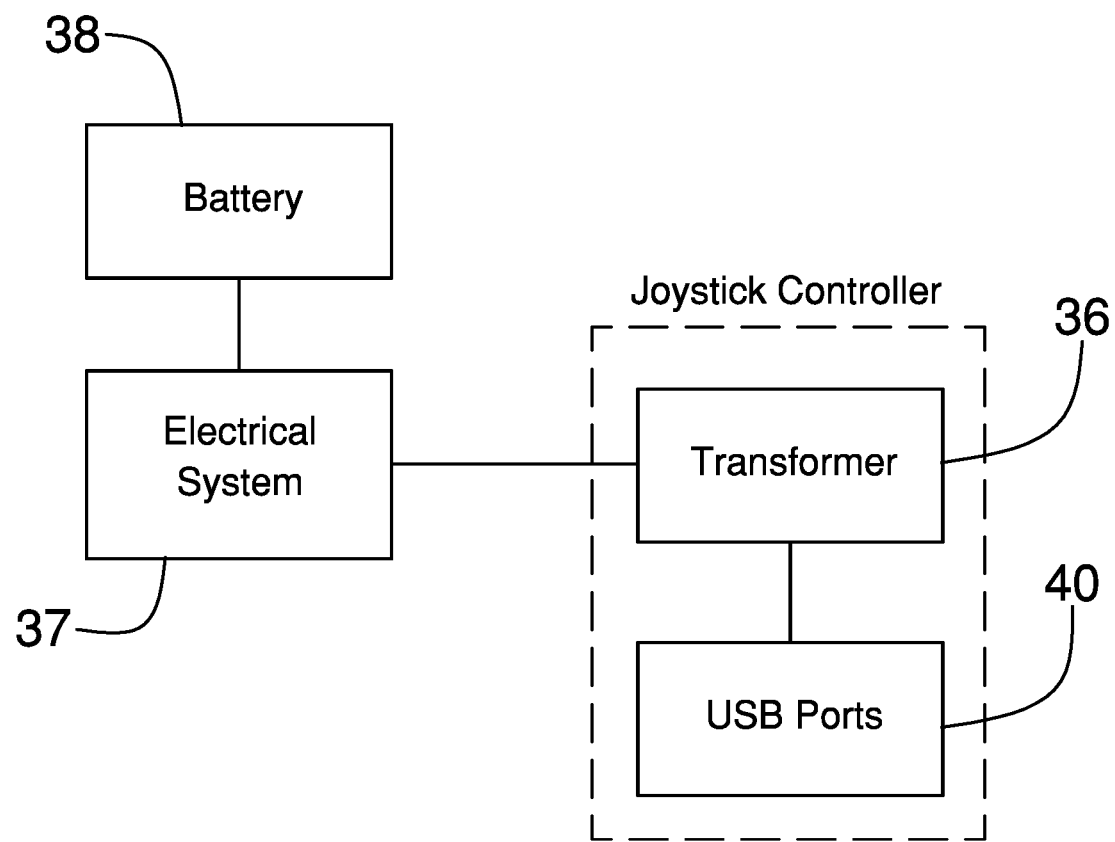
FIG. 5 is a block diagram view of an embodiment of the disclosure.

With reference now to the drawings, and in particular to FIGS. 1 through 5 thereof, a new motorized personal transport controller embodying the principles and concepts of an embodiment of the disclosure and generally designated by the reference numeral 10 will be described.

As best illustrated in FIGS. 1 through 5, the motorized personal transport controller and charging port 10 generally comprises a control housing 12. The control housing may have a flat top side 14, a tapered outer perimeter 16, and a bottom side 18. The top side 14, the outer perimeter 16, and the bottom side 18 form an inner cavity 20. The control housing 12 is configured to be coupled to a motorized personal transport 22. The motorized personal transport 22 may be an electric wheelchair 24 or an electric scooter 26. A plurality of controls 28 is coupled to the control housing 12 and is configured to control the motorized personal transport 22. The plurality of controls 28 may comprise a joystick 30 and a circular control pad 32. A charging means 34 is coupled to the control housing 12. The charging means 34 may comprise a transformer 36 coupled within the inner cavity 20. The transformer 36 is configured to be in operational communication with an electrical system 37. The electrical system 37 comprises a battery 38. The transformer 36 is configured to convert power from the battery 38 to a usable voltage. A plurality of ports 40 is coupled to the control housing 12 and extends through the top side 14 to the inner cavity 20. The plurality of ports 40 is in operational communication with the transformer 36. The plurality of ports 40 is configured to receive a charging cable to charge a plurality of personal electronic devices. The plurality of ports 40 may be a pair of USB ports 42.

In use, the motorized personal transport 22 is used as normal with the plurality of ports 40 easily available to charge the plurality of personal electronic devices.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized personal transport controller and charging port comprising:
   a control housing, the control housing having a top side, an outer perimeter, and a bottom side, the top side, the outer perimeter, and the bottom side forming an inner cavity, the control housing being configured to be coupled to a motorized personal transport, the top side being planar, the bottom side having a curved medial section such that a rearward portion of the control housing has a height greater than a forward portion of the control housing;
   a plurality of controls coupled to the control housing, the plurality of controls being configured to control the motorized personal transport, the plurality of controls comprising a joystick and a circular control pad, the joystick being positioned on the rearward portion of the control housing, the circular control pad being positioned on the forward portion of the control housing such that the control housing is configured to facilitate positioning of a user's thumb adjacent to the circular control pad when fingers of the user are positioned against the curved medial section;
   a transformer coupled to the control housing, the transformer being coupled within the inner cavity, the transformer being configured to be in operational communication with the battery of the motorized personal transport; and
   a plurality of ports coupled to the control housing, the plurality of ports extending through the top side, the plurality of ports being in operational communication with the transformer, the plurality of ports being configured to receive a charging cable.

2. The motorized personal transport controller and charging port of claim 1 further comprising the electrical system comprising a battery.

3. The motorized personal transport controller and charging port of claim 1 further comprising the plurality of ports being a pair of USB ports.

4. The motorized personal transport controller and charging port of claim 1 further comprising the top side of the control housing being flat and the outer perimeter being tapered.

5. A motorized personal transport and motorized personal transport controller and charging port system comprising:
   a motorized personal transport, the motorized personal transport having an electrical system, the electrical system comprising a battery;
   a control housing, the control housing having a flat top side, a tapered outer perimeter, and a bottom side, the top side, the outer perimeter, and the bottom side forming an inner cavity, the control housing being coupled to the motorized personal transport, the top side being planar, the bottom side having a curved medial section such that a rearward portion of the control housing has a height greater than a forward portion of the control housing;
   a plurality of controls coupled to the control housing, the plurality of controls controlling the motorized personal transport, the plurality of controls comprising a joystick and a circular control pad, the joystick being positioned on the rearward portion of the control housing, the circular control pad being positioned on the forward portion of the control housing such that the control housing is configured to facilitate positioning of a user's thumb adjacent to the circular control pad when fingers of the user are positioned against the curved medial section;
   a transformer coupled to the control housing, the transformer being coupled within the inner cavity, the transformer being in operational communication with the battery of the motorized personal transport; and
   a plurality of ports coupled to the control housing, the plurality of ports extending through the top side, the plurality of ports being in operational communication with the transformer, the plurality of ports being configured to receive a charging cable to charge a plurality of personal electronic devices, the plurality of ports being a pair of USB ports.

6. A motorized personal transport and motorized personal transport controller and charging port system comprising:
   a motorized personal transport, the motorized personal transport having a battery, the motorized personal transport being an electric wheelchair or an electric scooter;
   a control housing, the control housing having a flat top side, a tapered outer perimeter, and a bottom side, the top side, the outer perimeter, and the bottom side forming an inner cavity, the control housing being coupled to the motorized personal transport, the top side being planar, the bottom side having a curved medial section such that a rearward portion of the control housing has a height greater than a forward portion of the control housing;
   a plurality of controls coupled to the control housing, the plurality of controls controlling the motorized personal transport, the plurality of controls comprising a joystick and a circular control pad, the joystick being positioned on the rearward portion of the control housing, the circular control pad being positioned on the forward portion of the control housing such that the control housing is configured to facilitate positioning of a user's thumb adjacent to the circular control pad when fingers of the user are positioned against the curved medial section;
   a transformer coupled to the control housing, the transformer being coupled within the inner cavity, the transformer being in operational communication with the battery of the motorized personal transport; and
   a plurality of ports coupled to the control housing, the plurality of ports extending through the top side, the plurality of ports being in operational communication with the transformer, the plurality of ports being configured to receive a charging cable to charge a plurality of personal electronic devices, the plurality of ports being a pair of USB ports.

* * * * *